US011846323B2

(12) United States Patent
Bierlein et al.

(10) Patent No.: US 11,846,323 B2
(45) Date of Patent: Dec. 19, 2023

(54) ROTOR BEARING OF A WIND TURBINE

(71) Applicant: Schaeffler Technologies AG & Co. KG, Herzogenaurach (DE)

(72) Inventors: Andreas Bierlein, Hassfurt (DE); Rainer Schröder, Egenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 178 days.

(21) Appl. No.: 17/437,569

(22) PCT Filed: Mar. 3, 2020

(86) PCT No.: PCT/DE2020/100143
§ 371 (c)(1),
(2) Date: Sep. 9, 2021

(87) PCT Pub. No.: WO2020/182251
PCT Pub. Date: Sep. 17, 2020

(65) Prior Publication Data
US 2022/0163067 A1  May 26, 2022

(30) Foreign Application Priority Data
Mar. 12, 2019 (DE) .......................... 102019106276.4

(51) Int. Cl.
*F16C 35/063* (2006.01)
*F03D 80/70* (2016.01)
(Continued)

(52) U.S. Cl.
CPC ............ *F16C 35/063* (2013.01); *F03D 80/70* (2016.05); *F16C 23/086* (2013.01);
(Continued)

(58) Field of Classification Search
CPC .. F03D 80/70; F16C 2240/34; F16C 2300/14; F16C 2360/31; F16C 33/60; F16C 35/063
See application file for complete search history.

(56) References Cited

U.S. PATENT DOCUMENTS

2013/0129269 A1* 5/2013 Grehn ................... F16C 19/505
384/450
2014/0112606 A1 4/2014 Greenfield et al.
(Continued)

FOREIGN PATENT DOCUMENTS

CN 2580190 Y 10/2003
CN 102192106 A * 9/2011 ............. F03D 80/70
(Continued)

OTHER PUBLICATIONS

Machine translation of JP 2007218394 A (Year: 2007).*
(Continued)

*Primary Examiner* — Christopher R Legendre
(74) *Attorney, Agent, or Firm* — Volpe Koenig

(57) ABSTRACT

A rotor bearing of a wind turbine, in particular a rotor bearing having an improved and simplified axial introduction of force into the inner ring. It is specified for this purpose that the inner ring of the rolling bearing has a greater axial length with respect to the axial length of the outer ring of the rolling bearing by a section of the inner ring that corresponds to the axial length of the outer ring and has the length being adjoined by additional sections, wherein the axial lengths of these sections differ in size.

18 Claims, 6 Drawing Sheets

(51) Int. Cl.
*F16C 23/08* (2006.01)
*F16C 33/58* (2006.01)
*F16C 33/60* (2006.01)

(52) U.S. Cl.
CPC ............ *F16C 33/585* (2013.01); *F16C 33/60* (2013.01); *F05B 2240/50* (2013.01); *F16C 2226/60* (2013.01); *F16C 2240/34* (2013.01); *F16C 2300/14* (2013.01); *F16C 2360/31* (2013.01)

(56) References Cited

U.S. PATENT DOCUMENTS

| 2018/0128248 | A1 | 5/2018 | Wendeberg et al. |
| 2022/0163067 | A1* | 5/2022 | Bierlein ................ F16C 35/063 |

FOREIGN PATENT DOCUMENTS

| CN | 102207129 | A | 10/2011 | |
| CN | 103790957 | A | 5/2014 | |
| CN | 104271971 | A | 1/2015 | |
| CN | 204533199 | U | 8/2015 | |
| CN | 107023561 | A | 8/2017 | |
| DE | 1958363 | | 4/1967 | |
| DE | 19611723 | A1 | 10/1996 | |
| DE | 20005227 | U1 | 8/2000 | |
| DE | 10310639 | | 9/2004 | |
| DE | 102009041747 | | 3/2011 | |
| DE | 102009059655 | | 6/2011 | |
| DE | 102014204140 | A1 * | 9/2015 | ............ F16C 23/086 |
| DE | 102014104862 | A1 | 10/2015 | |
| DE | 102014104863 | A1 | 10/2015 | |
| DE | 102015204970 | | 9/2016 | |
| DE | 102015214330 | A1 | 2/2017 | |
| DE | 102016223543 | | 5/2018 | |
| DE | 102017110742 | | 11/2018 | |
| EP | 1457673 | | 9/2004 | |
| EP | 1519058 | A2 | 3/2005 | |
| EP | 2431623 | A2 | 3/2012 | |
| JP | 2001-182754 | A | 7/2001 | |
| JP | 2007218394 | | 8/2007 | |
| JP | 2007-292305 | A | 11/2007 | |
| JP | 2010190408 | A | 9/2010 | |
| WO | 2009018976 | | 2/2009 | |
| WO | 2014038990 | A1 | 3/2014 | |
| WO | WO-2015101177 | A1 * | 7/2015 | ............ F16C 35/063 |
| WO | 2018/091016 | A1 | 5/2018 | |
| WO | 2018/131618 | A1 | 7/2018 | |

OTHER PUBLICATIONS

Chinese Office Action dated Aug. 2, 2022 for Chinese Patent Application No. 202080013145.9.
European Office Action dated Sep. 8, 2022 for European Patent Application No. 20711495.0.

* cited by examiner

ROTOR BEARING OF A WIND TURBINE

CROSS-REFERENCE TO RELATED APPLICATIONS

This application is the U.S. National Phase of PCT Appln. No. PCT/DE2020/100143, filed Mar. 3, 2020, which claims priority to DE 102019106276.4, filed Mar. 12, 2019, the entire disclosures of which are incorporated by reference herein.

TECHNICAL FIELD

The disclosure relates to a rotor bearing of a wind turbine, in particular to a rotor bearing having an improved axial introduction of force into the inner ring.

BACKGROUND

A conventional rotor bearing for a wind turbine is known from DE 10 2009 041 747 A1. There, a double-row spherical roller bearing is used as a rolling bearing, which has an inner ring, an outer ring and rolling bodies rolling between the two running rings. The axial length of the inner ring corresponds to the axial length of the outer ring. In order to support a rotor shaft of a wind turbine, it penetrates the bore of the inner ring, while the outer ring of the rolling bearing is received in a housing. The latter can be found in DE 103 10 639 A1. This document also reveals that two shoulders are provided for axially securing the inner ring on a circumferential section of the rotor shaft, which shoulders axially delimit the circumferential section. This axial limitation of the circumferential section is implemented by a shaft shoulder on the side close to the rotor, a separate spacer ring being provided between the shaft shoulder and the inner ring in order to introduce axial forces from the rotor shaft into the inner ring at the smallest possible angle. The axial delimitation of the circumferential section on the side away from the rotor can be implemented by a shaft nut, as can be found in DE 102009 059 655 A1. Even if the rolling bodies of the two roller rows have a symmetrical pressure angle in DE 10 2009 041 7474 A1, the roller row away from the rotor can—as shown in DE 10 2015 204 970 A1—have a larger pressure angle for better absorption of axial forces compared to the roller row close to the rotor.

In addition, the bearing rings do not necessarily have to be designed as closed rings, but—as DE 10 2017 110 742 A1 shows—for better interchangeability of the rolling bearing, they can each be formed by two ring halves, which are held together by clamping rings after completion to form an inner ring, for example, by placing the clamping ring segments forming the clamping ring around the formed inner ring and connecting them by screws screwed through the clamping ring segments.

However, if bearing rings are split radially, the problem arises at high loads that the bearing rings that are split and fastened by clamping rings have a somewhat lower axial stability, which has a detrimental effect on the service life of such rolling bearings.

SUMMARY

The disclosure is therefore based on the object of disclosing a rotor bearing which has a simplified design and is characterized by improved stability.

This object is achieved with a rotor bearing having one or more of the features described herein. Advantageous embodiments and further developments of are listed below and in the claims.

If the inner ring has a first axial section of the length $L2$, which corresponds to the axial length $L3$ of the outer ring, and has two second sections being axially adjoined by the first section, of different axial lengths $L4$; $L4.1$, $L4.2$, because the inner ring completely fills the circumferential section between the two shoulders of the rotor shaft, the axial force is introduced from the rotor shaft directly into the inner ring at a flatter and therefore advantageous angle, without the need for additional spacer rings that increase the effort. Because the inner ring has a greater axial length in relation to the outer ring and extends as an at least axially one-piece component between the two shoulders of the circumferential section, this one-piece design improves the fit of the inner ring on the rotor shaft overall. This is particularly the case when the section of greater axial length adjoins the side of the inner ring which faces the rotor.

The axial power transmission is further improved if a rolling bearing is a double-row spherical roller bearing, wherein the rolling bodies of the roller row closer to the rotor have a smaller pressure angle compared to the rolling bodies of the other roller row.

If the rolling bearing is designed as a radially split rolling bearing, replacing the rolling bearing is simplified.

A good connection between the inner ring and the rotor shaft is provided when at least two clamping ring segments are provided which, in the connected state, result in a clamping ring, and the inner ring is held together on the rotor shaft by clamping rings that surround the second sections of the inner ring for this purpose.

The seal is simplified if the clamping rings provide at least radially outer circumferential surfaces which form at least one sealing surface interacting with a sealing partner. The sealing surfaces can be in operative connection both with a contacting seal and with a non-contacting counter surface separated by a small distance.

An uninterrupted sealing surface is created when a mutual distance A remaining between the end surfaces of two assembled clamping ring segments is filled with a plastic or metal in such a way that the circumferential surface of one clamping ring segment merges seamlessly into the circumferential surface of the other clamping ring segment. Installation space and material-saving clamp rings are provided when the axial extent of the clamping rings along the rotational axis of the rotor shaft, starting from the center of the bore, differs in size, so sealing surfaces related to the bores are only provided on the side of the clamping rings, on which they are required.

The sealing effect is further improved if seals are provided between the clamping rings and the second sections of the inner rings.

DETAILED DESCRIPTION

The embodiments will now be explained in more detail with reference to the figures.

Figure 1:
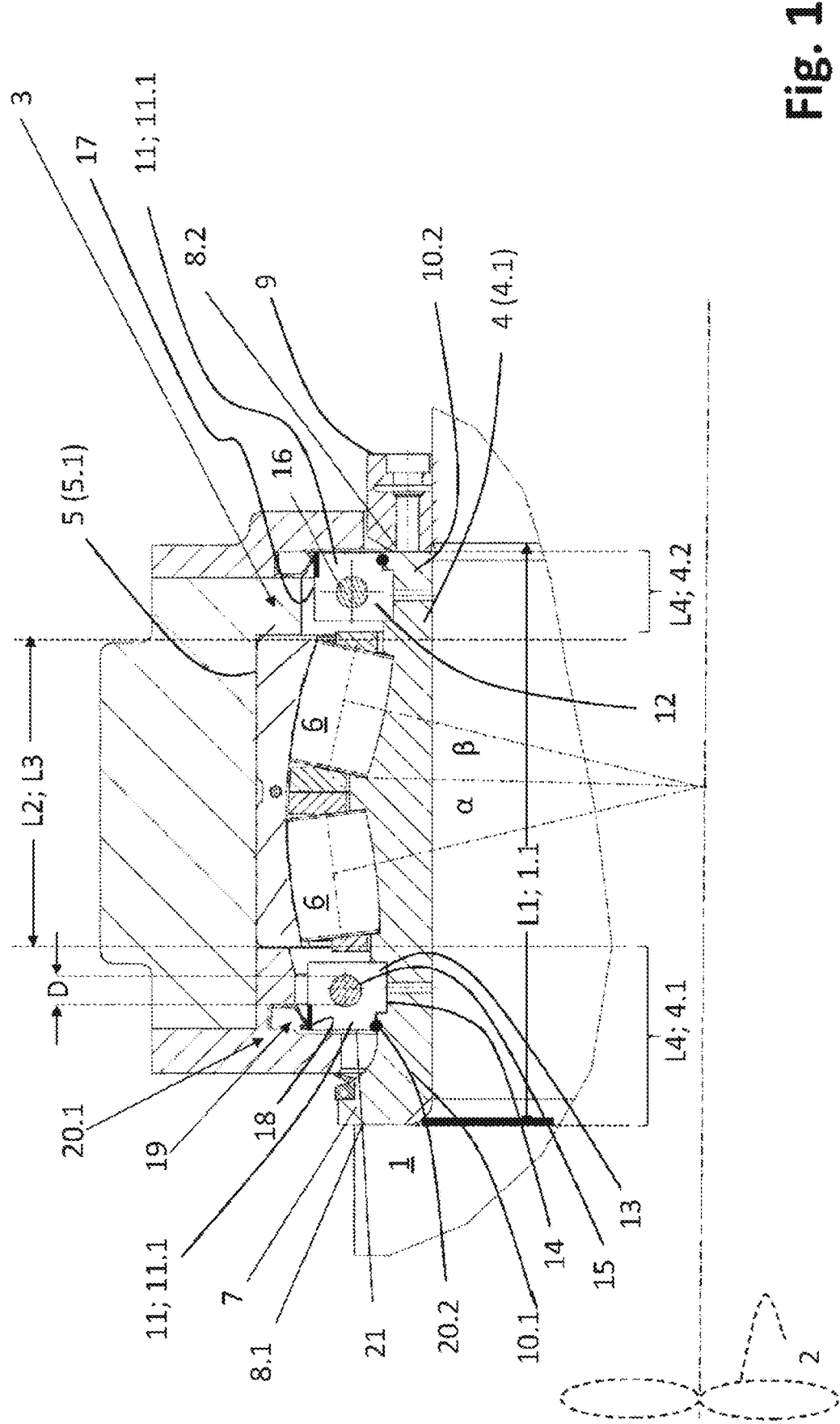
FIG. 1 shows a rotor shaft supported by a radially split asymmetrical spherical roller bearing.

In FIG. 1, a rotor shaft 1 of a wind turbine is shown. A rotor 2, indicated in FIG. 1, which drives the rotor shaft 1, is connected to one end of this rotor shaft 1. In this exemplary embodiment, this rotor shaft 1 is supported by a rolling bearing 3 in the form of a two-row spherical roller bearing, which has an inner ring 4, an outer ring 5, rolling bodies 6, which are arranged in two rows between the bearing rings 4, 5, and cage elements, 12 (not described in more detail) which space the rolling bodies 6 apart in the circumferential direction. The rolling bodies 6 of the different roller rows roll at different pressure angles α, β between the two bearing rings 4, 5, the rolling bodies 6 of the roller row facing away from the rotor 2 being at the greater pressure angle β compared to the rolling bodies 6 of the other roller row.

In order to facilitate the replacement of the rolling bearing 3, both the inner ring 4 and the outer ring 5 are radially split, wherein each of the two bearing rings 4, 5 of two half-shells 4.1, 4.2; 5.1, 5.2 (only partially visible in FIG. 1) complementing each other to form a bearing ring 4.5 is formed. The hatching shown discloses that the two half-shells 4.1, 4.2 of the inner ring 4 and the two half-shells 5.1, 5.2 of the outer ring 5 are adjacent to one another in the assembled state at 9 o'clock and 3 o'clock.

The rolling bearing 3 is connected to the rotor shaft 1 with its inner ring 4. In the present case, this is implemented in such a way that the inner ring 4 or the half-shells 4.1, 4.2 forming the inner ring 4 are placed around the rotor shaft 1. In order to preclude an axial displacement of the formed inner ring 4 along the rotor shaft 1, a shaft shoulder 7 on the rotor side is in contact with the first end faces 8.1 of the formed inner ring 4. On the circumferential section 9 of the rotor shaft 1 facing away from the rotor 2 and provided for receiving the inner ring 4, the shoulder required for axially fixing the inner ring 4 is formed by a shaft nut 9, which is tightened after the rolling bearing 3 has been mounted and therefore rests on the second end face 8.2 of the formed inner ring 4.

In order to increase this axial rigidity of the rolling bearing 3 on the rotor shaft 1 and at the same time introduce axial forces at a flat angle from the shaft shoulder 7 into the inner ring 4, the formed inner ring 4 not only has an axial length L3 that corresponds to the axial length L2 of the formed outer ring 5, but is designed to be extended in both axial directions by sections 10.1, 10.2 of length L4; 4.1, 4.2 in relation to the outer ring 5 to which it is arranged, wherein the section 10.1 extends with the greater axial length L4.1 in the direction of the rotor 2. Consequently, the circumferential section 1.1 of the rotor shaft 1, which receives the inner ring 4 between the shaft shoulder 7 and the shaft nut 8, has a length L1, i.e., L3 plus L4.1 plus L4.2 and is therefore completely filled by the inner ring 4.

In order to also fix the inner ring 4 formed from the two half-shells 4.1, 4.2 radially on the rotor shaft 1, clamping rings 11 are provided. Each of these clamping rings 11 is formed by two half-shell-shaped clamping ring segments 11.1, 11.2 which complement each other to form a ring, of which only one clamping ring segment 11.1 is visible in the selected representation in FIG. 1. Since the respective clamping ring segments 11.1 (11.2), which form a clamping ring 11, about one another at 6 o'clock and 12 o'clock, the circumferential end surfaces 12 of the clamping ring segments 11.1 are also shown in FIG. 1.

In order to axially fix the clamping rings 11 formed on the inner ring 4, the clamping rings 11 or the clamping ring segments 11.1 (11.2) have radially inwardly pointing projections 13 which, after assembly, engage in annular grooves 14 provided in the area of sections 10.1, 10.2 on the inner ring 4. In order to improve the tightness between the inner ring 4 and the clamping rings 11, seals 20.2 in the form of O-rings are provided between the clamping rings 11 and the inner ring 4.

Bores 15 are guided through the respective clamping ring segments 11.1 (11.2), which, in the connected state, form a clamping ring 11, which—as shown for the half-shell 11.1—extend perpendicular to the paper plane. Countersunk screws 16 are screwed in through these bores 15 in order to connect the two clamping ring segments 11.1 (11.2) to form a clamping ring 11.

If the respective clamping ring segments 11.1, 11.2 are assembled to form a clamping ring 11 on the inner ring 4, an outer, annular circumferential surface 17 is created, which, in this exemplary embodiment, is in sealing contact as a sealing surface 18 with a sealing lip 19 of a contacting seal 20.1 acting as a sealing partner. In order to prevent the sealing lip 19 from wearing out because it comes into contact with the bores 15, the sealing surface 18 begins at the axially outer end 21 of the clamping ring 11 and ends where the bores 15 of diameter D penetrate the clamping rings 11. In relation to the bore 15, this means that the part of the circumferential surface 17 which serves as a sealing surface 18 has a greater axial extent than the circumferential surface on the other side of the bore 15. To better illustrate the relationships, the sealing surface 18, which begins at the axial end 21 of the clamping ring 11 and ends at the diameter D of the bore 15, is drawn to be bolder in FIG. 1.

Figure 2B:
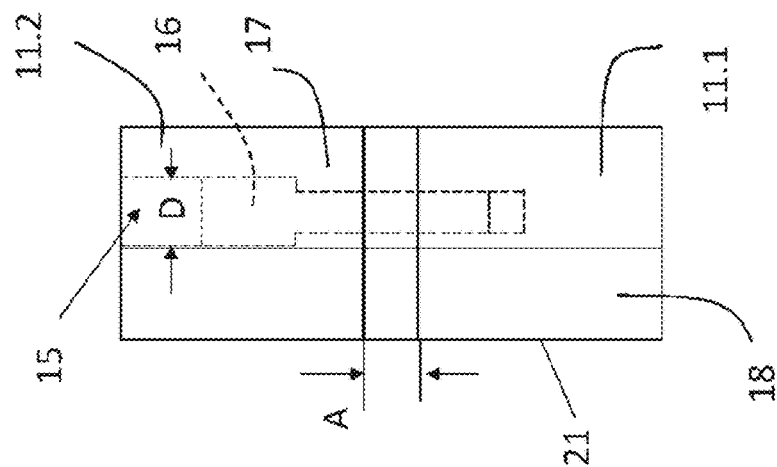
FIGS. 2A and 2B show a transition between two clamping ring segments forming a clamping ring.
Figure 2A:
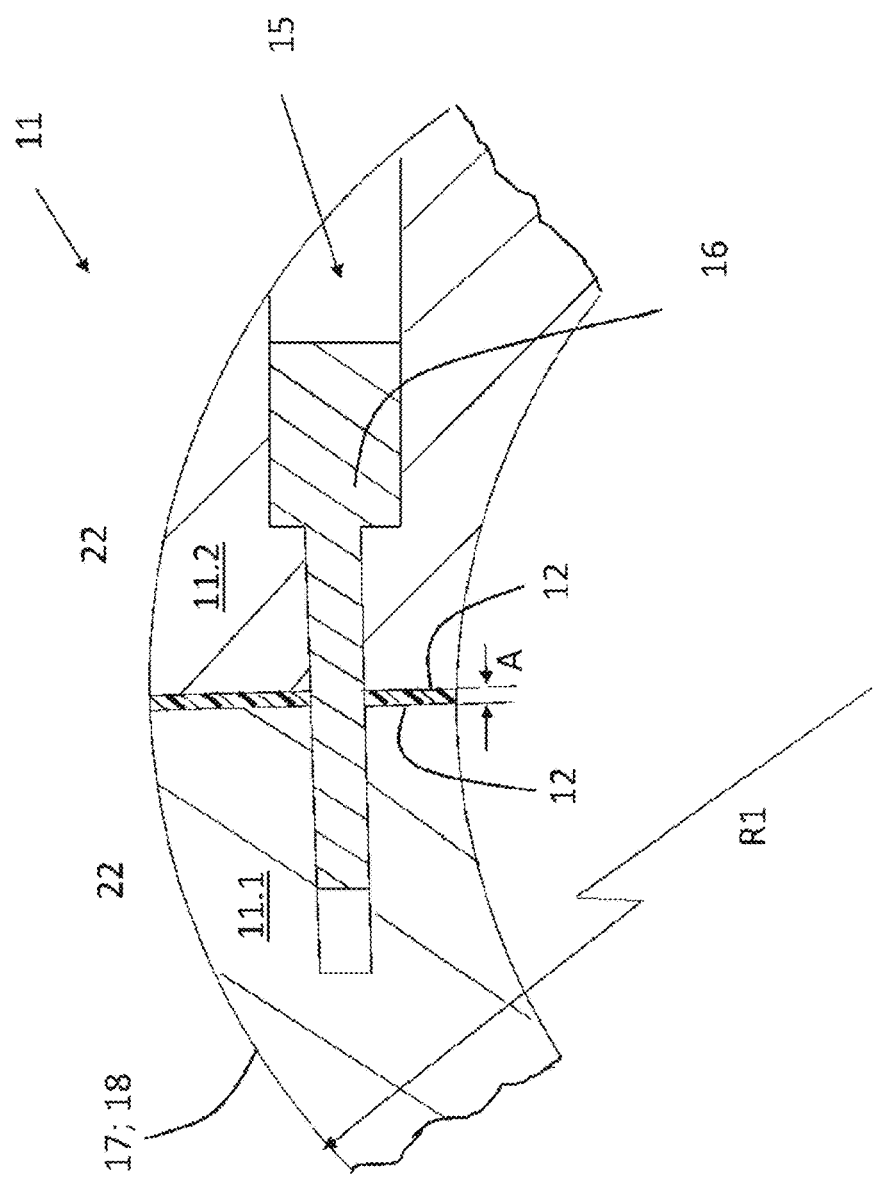

In FIG. 2A, two clamping ring segments 11.1, 11.2 forming a clamping ring 11 are shown in detail. Both clamping ring segments 11.1, 11.2 are connected by a screw 16 which is screwed through bores 15 provided in the clamping ring segments 11.1, 11.2. If the two clamping ring segments 11.1, 11.2 are finally assembled by tightening the screw 16 on the inner ring 4, a small distance A remains between the end surfaces 12 of the two clamping ring segments 11.1, 11.2 in order to produce the required clamping effect. In this exemplary embodiment, this distance A is filled with a plastic material based on epoxy resin so that the circumferential surface 17 of the clamping ring segment 11.1 merges seamlessly into the circumferential surface 17 of the other clamping ring segment 11.2 while maintaining the radius of curvature R1 specified by the clamping ring segments 11.1, 11.2.

FIG. 2B shows a plan view of the transition between two clamping ring segments 11.1, 11.2 according to FIG. 2A. This representation also shows that the circumferential surface 17 expands to different extents in the axial direction in relation to the bore 15 and that the area with the greater axial extent serves as the sealing surface 18.

Figure 3:
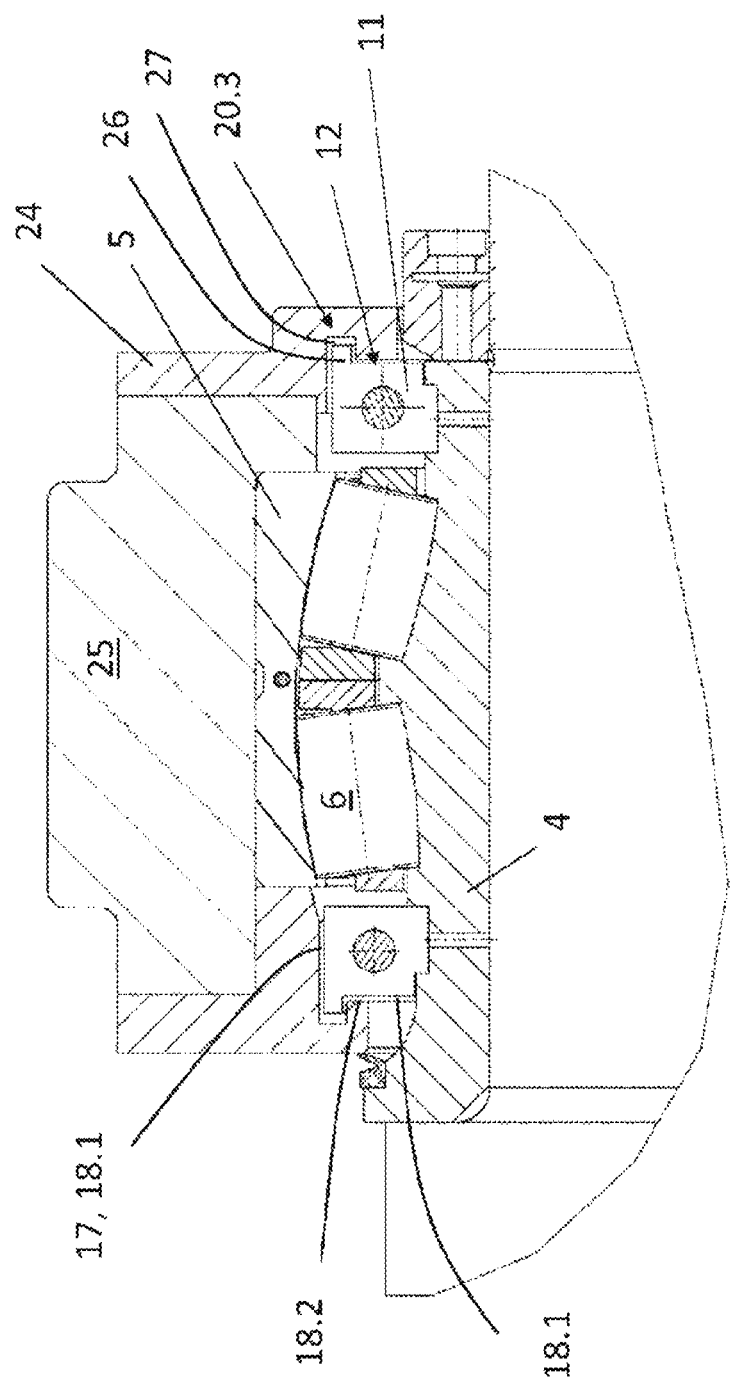
FIG. 3 shows a variant of an embodiment according to FIG. 1.

The embodiment according to FIG. 3 only differs from the embodiment according to FIG. 1 in that the seal shown there is not a contacting seal 20.1, but a non-contacting seal 20.3. This non-contacting seal 20.3 is essentially formed by the mounted clamping rings 11 and a component 24 which is connected to the housing 25. Thereby, both the outer circumferential surface 17 and also the axial outer end surface 21 of the clamping ring 11 form a common, angularly extending sealing surface 18.1, which interacts with a corresponding sealing surface 18.2 that maintains a small distance from the sealing surface 18.1 and is provided by the component 24. In order to further improve the sealing effect of this non-contacting seal 20.3, the clamping rings 11 in the area of their end surfaces 12 also have ring noses 26 which are directed axially outward and which engage corresponding recesses 27 in component 24.

Figure 4:
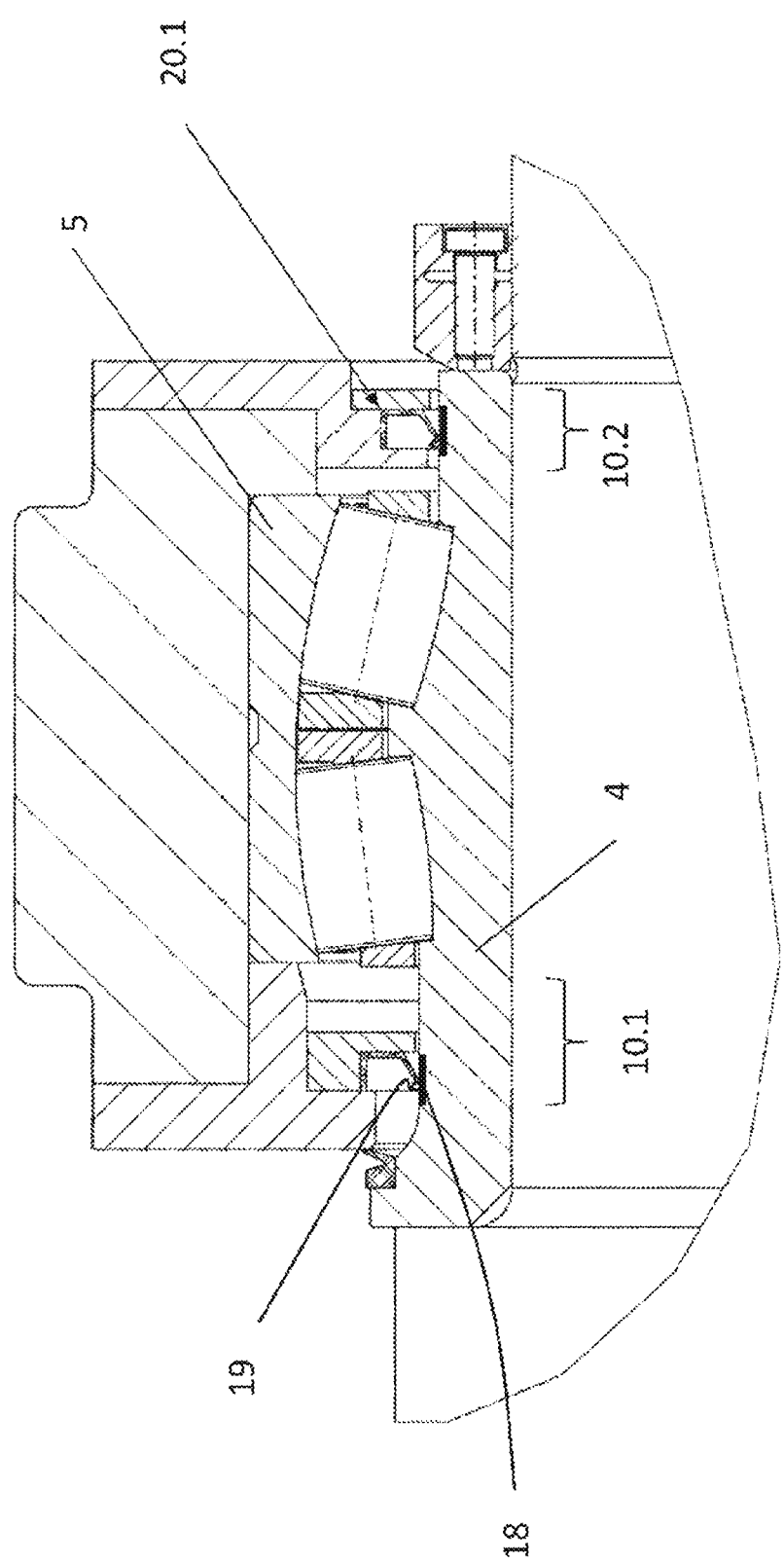
FIG. 4 shows a further variant of an embodiment according to FIG. 1.

FIG. 4 shows a variant of a rotor bearing according to FIG. 1. In this variant, the respective bearing rings 4, 5 are connected to the rotor shaft 1 as unsplit bearing rings 4, 5. Therefore, in this variant, no clamping rings 11 are required. In order to produce a seal of this variant by a contacting seal 20.1, the sealing lips 19 run on sealing surfaces 18 provided by the inner ring 4 in the area of the sections 10.1, 10.2. Of course, a variant according to FIG. 4 can also be provided with a non-contacting seal 20.3 in a simple development of the explanations relating to FIG. 3.

Figure 5:
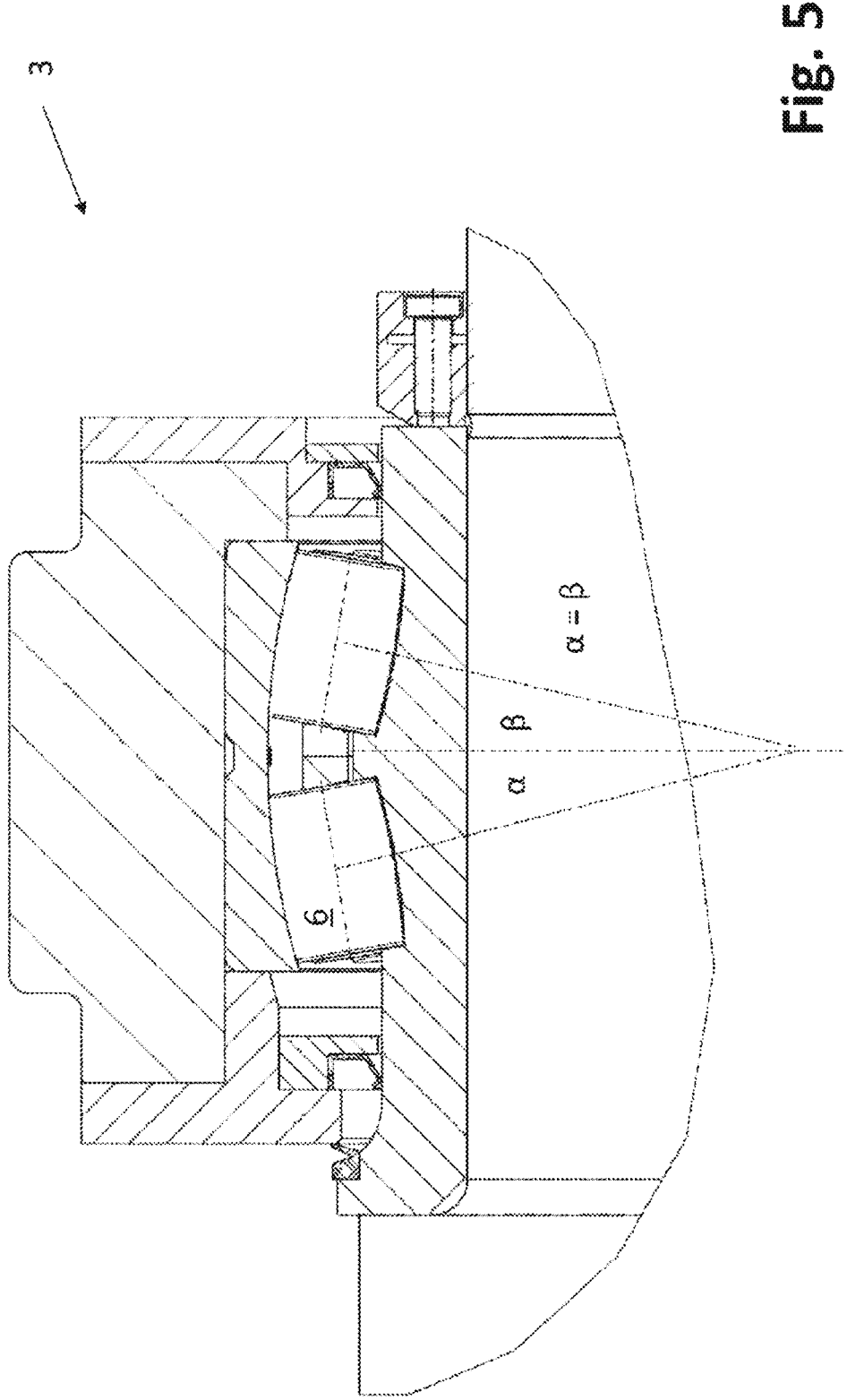
FIG. 5 shows a further variant of an embodiment according to FIG. 1.

The variant shown in FIG. 5 shows a two-row spherical roller bearing as rolling bearing 3, in which the rolling bodies 6 roll in both roller rows at the same pressure angle $\alpha$, $\beta$.

Figure 6:
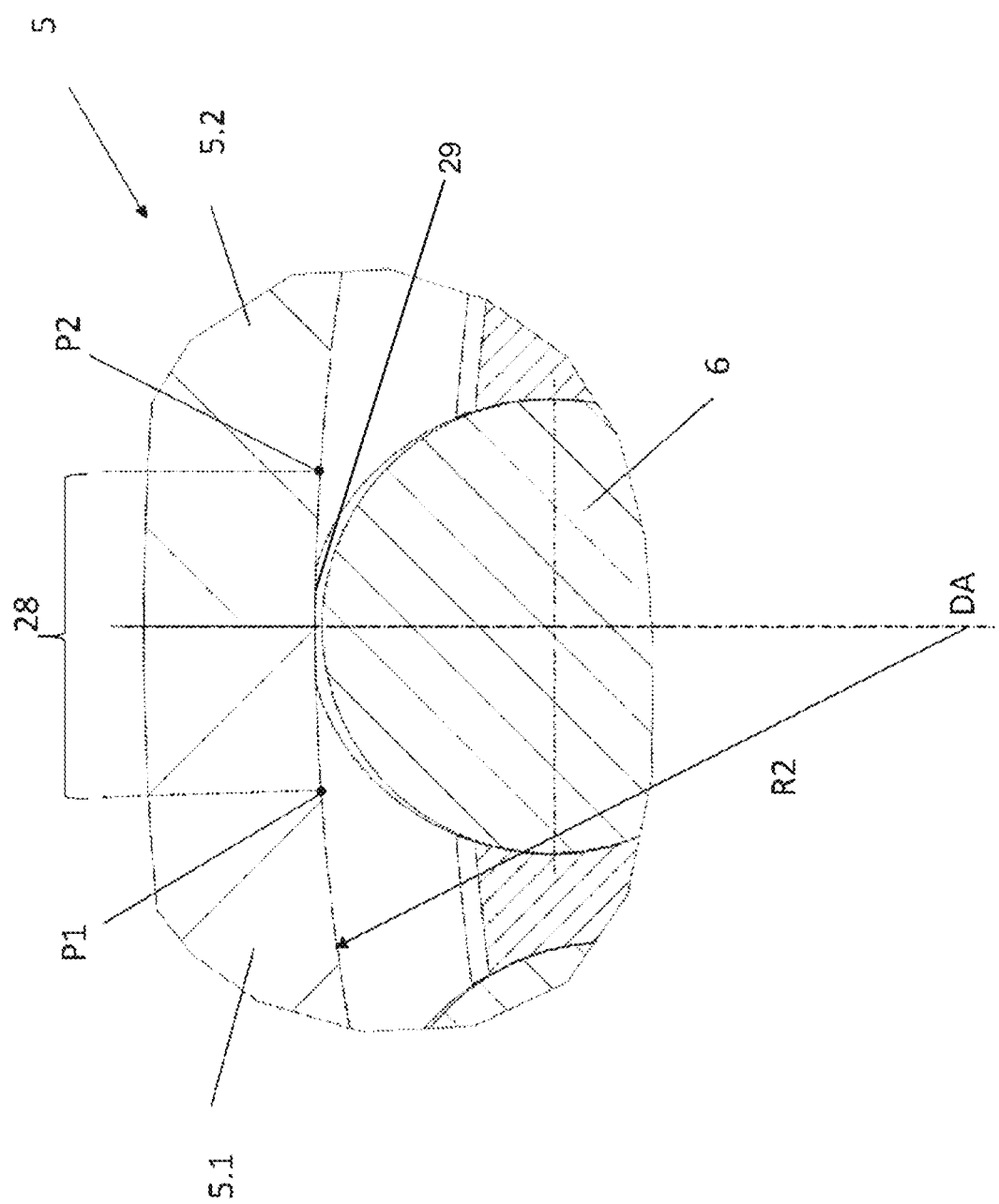
FIG. 6 shows a transition between two radially split outer rings.

FIG. 6 shows the transition 28 between two half-shells 5.1, 5.2, forming an outer ring 5 of a rolling bearing 3 according to the embodiment according to FIG. 1. This view, which runs in the direction of the rotational axis DA of the rolling bearing 3, shows a raceway 29 on the outer ring 5 (5.1, 5.2) on which the rolling bodies 6 roll. Except for the transition 28 between two half-shells 5.1, 5.2, the raceway 29 in the outer ring 5 or in the half-shells 5.1, 5.2 is circular, which is indicated by the radius R2. The raceway 29 only extends as a secant in the area of the transition 28 between the two points P1 and P2.

Even if the rolling bearing 3 is always shown as a spherical roller bearing in the exemplary embodiments, there is no definition of this type of bearing. It is also not necessary for the rotor shaft 1 to be of a wind turbine. For example, instead of the rotor shaft, other machine shafts can also be supported by the rolling bearings shown, for example where it is very difficult to remove the entire machine shaft to replace rolling bearings 3.

List of Reference Symbols
1 Rotor shaft
2 Rotor
3 Rolling bearing
4 Inner ring
5 Outer ring
6 Roll body
7 Shaft shoulder
8 End faces
9 Shaft nut
10 Section
11 Clamping ring
12 End surface
13 Projection
14 Annular groove
15 Bore
16 Screws
17 Circumferential surface
18 Sealing surface
19 Sealing lip
20 Seal
21 Axial end
22 Component
23 Housing
24 Ring nose
25 Recesses
26 Transition
27 Raceway

The invention claimed is:

1. A rotor bearing of a wind turbine, comprising:
a rolling bearing including an outer ring, an inner ring and rolling bodies rolling between the outer ring and the inner ring;
a rotor shaft having an axial circumferential section with a first length between two radial shoulders arranged at an axial distance from one another, said first length receives the inner ring of the rolling bearing;
a rotor connected to the rotor shaft; the inner ring has a first axial section with a second length, which corresponds to an axial length of the outer ring, and has two second sections that are axially adjoined to the first axial section that have different axial lengths from one another; and
clamping rings surrounding the second sections of the inner ring and adapted to hold the inner ring on the rotor shaft, the clamping rings provide at least radially outer circumferential surfaces which form at least one sealing surface configured to cooperate with a sealing partner, wherein an axial extent of the respective sealing surface begins at an axially outer end of the respective clamping ring and ends where a respective bore penetrates said clamping ring.

2. The rotor bearing according to claim 1, wherein an axially longer one of the second sections of the inner ring points in a direction of the rotor connected to the rotor shaft in a connected state to the rotor shaft.

3. The rotor bearing according to claim 1, wherein the rolling bodies are spherical and arranged in a first roller row and a second roller row bring, and the rolling bodies of the first roller row closer to the rotor have a smaller pressure angle $\alpha$ compared to a pressure angle $\delta$ of the rolling bodies of the second roller row.

4. The rotor bearing according to claim 1, wherein the rolling bearing is a radially split rolling bearing, such that the inner ring and the outer ring are each radially split.

5. The rotor bearing according to claim 4, wherein the clamping rings each include at least two respective clamping ring segments that form the clamping ring in a connected state.

6. The rotor bearing according to claim 5, wherein the respective clamping ring segments are connected to one another by screws that extend in the bores that penetrate through two adjacent ones of the clamping ring segments.

7. The rotor bearing according to claim 6, wherein an axial extent of the clamping rings along a rotational axis of the rotor shaft, starting from a center of the bore, differs in size.

8. The rotor bearing according to claim 5, wherein circumferential ends of the clamping ring segments maintain a small mutual distance in a circumferential direction in an assembled state and the distance A is filled with a plastic or metal to form a smooth, seamless transition between two of the clamping ring segments.

9. The rotor bearing according to claim 5, further comprising seals located between the clamping rings and the second sections of the inner rings.

10. A rotor bearing of a wind turbine, comprising:
a rolling bearing including an outer ring, an inner ring, and rolling bodies rolling between the outer ring and the inner ring;

a rotor shaft having an axial circumferential section between two radial shoulders arranged at an axial distance from one another that receives the inner ring of the rolling bearing;

a rotor connected to the rotor shaft;

the inner ring has a first axial section with a length, which corresponds to an axial length of the outer ring, and two second sections that are axially adjoined to opposite axial sides of the first axial section that have different axial lengths from one another; and clamping rings each including at least two respective clamping ring segments that form the clamping ring in a connected state, wherein circumferential ends of the clamping ring segments are spaced apart in a circumferential direction in an assembled state to form a gap that is filled with a plastic or metal to form a smooth, seamless transition between the circumferential ends of the clamping ring segments.

11. The rotor bearing according to claim 10, wherein an axially longer one of the second sections points in a direction of the rotor connected to the rotor shaft in a connected state to the rotor shaft.

12. The rotor bearing according to claim 10, wherein the rolling bodies are spherical and arranged in a first roller row and a second roller row, and the rolling bodies of the first roller row closer to the rotor have a smaller pressure angle $\alpha$ compared to a pressure angle $\delta$ of the rolling bodies of the second roller row.

13. The rotor bearing according to claim 10, wherein the rolling bearing is a radially split rolling bearing, such that the inner ring and the outer ring are each radially split.

14. The rotor bearing according to claim 13, wherein the inner ring is held together on the rotor shaft by the clamping rings which respectively surround the second sections.

15. The rotor bearing according to claim 14, wherein the clamping rings include at least radially outer circumferential surfaces, which form at least one sealing surface configured to cooperate with a sealing partner.

16. The rotor bearing according to claim 15, wherein the respective clamping ring segments of each clamping ring are connected to one another by screws that extend in bores that penetrate through adjacent ones of the clamping ring segments, and an axial extent of the respective sealing surface begins at an axially outer end of the respective clamping ring segment and ends where the respective bore penetrates said clamping ring segment.

17. The rotor bearing according to claim 16, wherein an axial extent of the clamping rings along a rotational axis of the rotor shaft, starting from a center of the bore, differs in size.

18. The rotor bearing according to claim 14, further comprising seals located between the clamping rings and the second sections of the inner rings.

* * * * *